(No Model.) 2 Sheets—Sheet 1.
S. B. CUMMINGS & D. W. FIELD.
FILTER.
No. 522,407. Patented July 3, 1894.
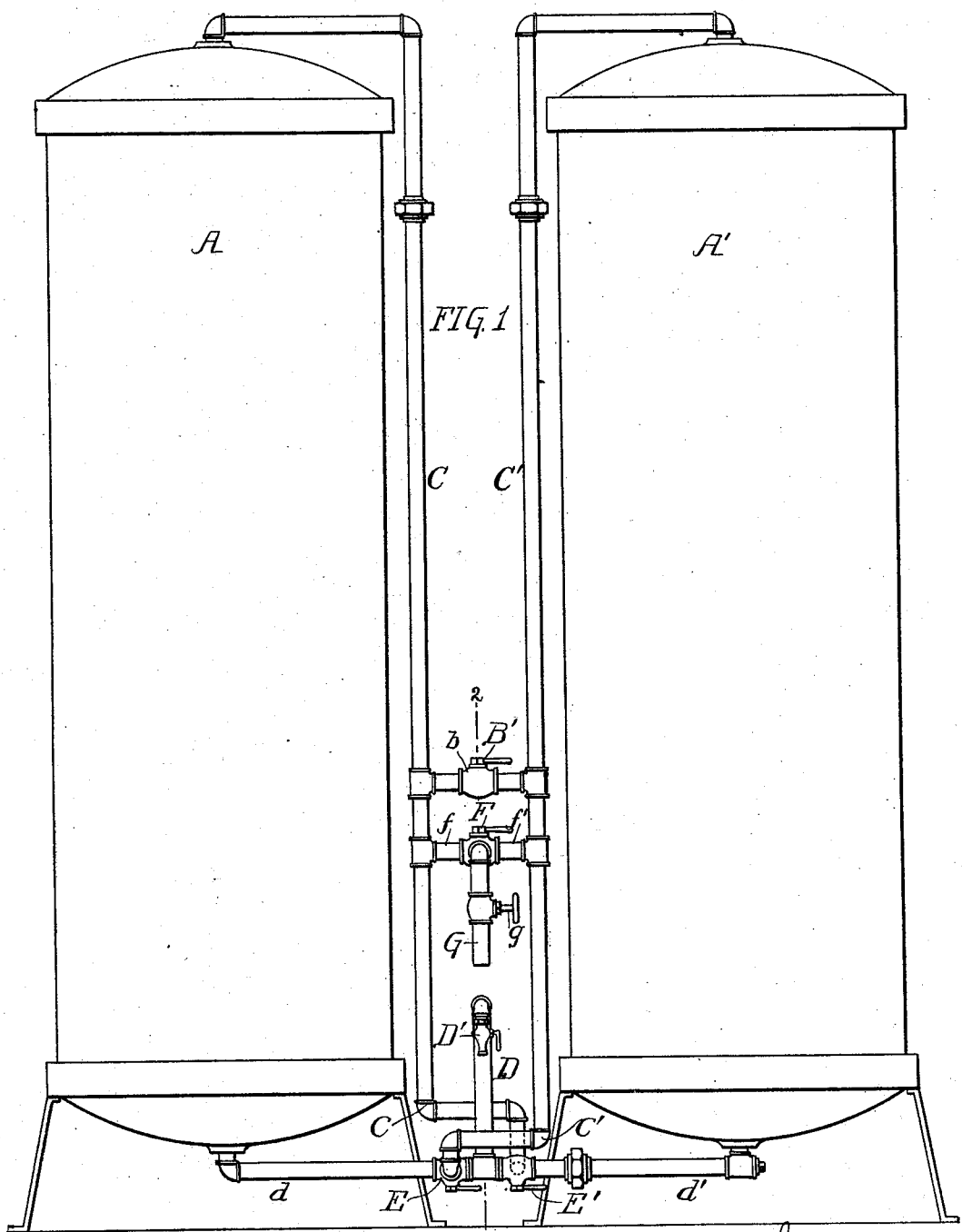

(No Model.) 2 Sheets—Sheet 2.

S. B. CUMMINGS & D. W. FIELD.
FILTER.

No. 522,407. Patented July 3, 1894.

Witnesses
Jno E Parker
J. Henderson

Inventors:
S. B. Cummings
and David W. Field
by their Attorney,

THE NORRIS PETERS CO., PHOTO-LITHO., WASHINGTON, D. C.

UNITED STATES PATENT OFFICE.

SAMUEL B. CUMMINGS, OF PITTSBURG, AND DAVID W. FIELD, OF PHILADELPHIA, PENNSYLVANIA.

FILTER.

SPECIFICATION forming part of Letters Patent No. 522,407, dated July 3, 1894.

Application filed February 5, 1894. Serial No. 499,106. (No model.)

*To all whom it may concern:*

Be it known that we, SAMUEL B. CUMMINGS, of Pittsburg, and DAVID W. FIELD, of the city of Philadelphia, State of Pennsylvania, both citizens of the United States, have invented certain new and useful Improvements in Filters, of which the following is a full, clear, and exact description, reference being had to the accompanying drawings, forming part of this specification.

Our invention relates to filters of the class patented to William D. Cummings by Letters Patent of the United States No. 424,762, dated April 1, 1890, and consists principally in improvements upon the constructions described in the said patent, as hereinafter particularly described and claimed.

Our invention has for its object to provide a simplified construction of piping connection and three-way cocks in combination with the filtering chambers for directing the flow of the liquid principally in the same main pipes at different times in different directions so that the flow of the liquid to be filtered may be absolutely controlled, and forced through one or both chambers singly, or the fluid after leaving one chamber be filtered through the second; or, one, or both chambers may be cleansed by a flow of the fluid in a direction the reverse of that in which it passes when being filtered. The arrangement of pipes and three way valves being also such as to direct unfiltered water for the purpose of washing out either cylinder from the bottom while the flow of water is being directed through the other cylinder from the main in the process of single filtration. The disposition of piping connections is such that the number is reduced to a minimum, the two main connections being arranged to control the flow of fluid at different stages of the filtration process and at different times in different directions. The pipes and valves forming this system are also arranged within a small space and the flow of the fluid in the various directions may be readily controlled without inconvenience.

In the accompanying drawings:—Figure 1 is a front elevation of two filtering chambers, illustrating the arrangement of controlling valves and pipes for governing the flow of fluid, in accordance with our invention. Fig. 2 is a sectional elevation of the same on the line 2—2 Fig. 1, and Figs. 3, 4, 5, and 6 are diagrams of the system of pipes and valves, showing the plan of the latter arranged in different positions for different directions of flow.

Referring to the drawings A, A', illustrate two filtering chambers of any ordinary construction, filled with a filtering medium of any desired character, and having at their upper ends inlets for the fluid to be filtered and at their lower ends outlets for the filtered fluid. Midway between the two chambers is an inlet or supply pipe, B, through which the fluid is supplied to the filtering chambers. This pipe terminates in a chamber, $b$, from which extend branch pipes, C, C', running respectively to the upper or inlet ends of the chambers A and A'. The chamber, $b$, contains a three-way valve, B', by which the flow of fluid may be shut off altogether or directed from the pipe, B, through one or other, or both of the pipes, C, C'.

The outlets from the chambers are formed by pipes, $d$, $d'$, which are connected to a central discharge pipe, D, having a pet cock, D', for testing the flow and purity of the filtered fluid.

The pipes, C, C', are continued down to the discharge pipes, $d$, $d'$, and are connected to them, the pipe, C, to the pipe, $d'$, and the pipe, C', to the pipe, $d$, through three-way valves, E', E, respectively.

At a point below the inlet, B, the pipes, C, C', are connected by a branch pipe, F, in which is a valve chamber containing a three-way valve, F, and from the chamber also extends a waste pipe, G, in which is a controlling valve, $g$. The direction of flow of the fluid is more clearly illustrated in the diagrams Figs. 3, 4, 5 and 6.

Figure 3:
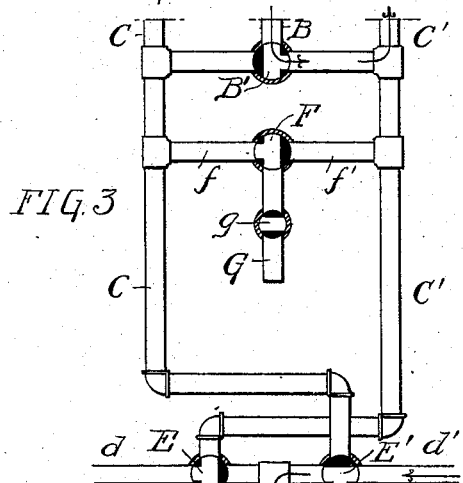
Fig. 3 represents the position of the valves when the fluid is flowing through the chamber, A', only, and the direction of flow, as indicated by the arrows is through pipe, B, and valve B', and pipe, C', to filter, A'. From the lower end of filter, A', the fluid passes through pipe, d', valve, E', and out through the discharge pipe, D.
Figure 4:
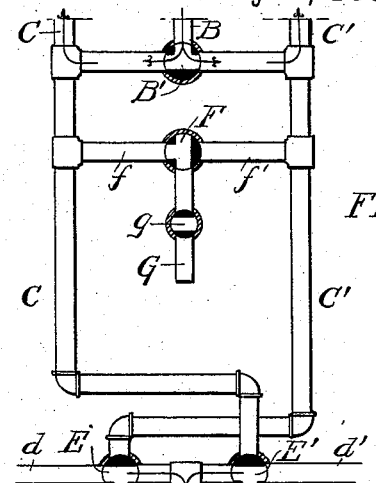
Fig. 4 illustrates a direction of flow similar to that described with reference to Fig. 3 except that the fluid is directed through both chambers, A, A', at the same time and is discharged through the pipes, d, d', leading to the common discharge, D.
Figure 5:
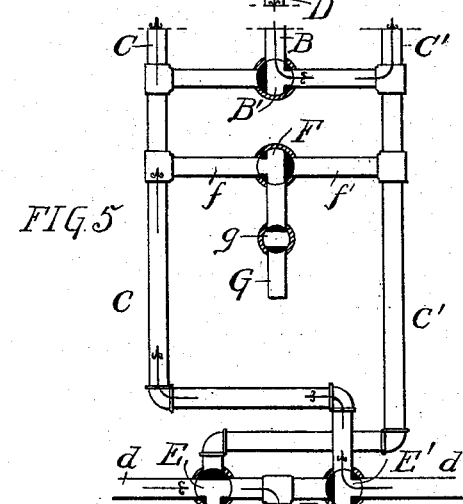
Fig. 5 illustrates the position of the valve when the fluid after leaving one chamber is directed also through the second chamber and filtered twice. In this arrangement the fluid after leaving the chamber, A', passes through the pipe, d', to valve, E', and from thence by the pipe, C, to the upper end of the chamber, A, and after passing through the latter is discharged by way of pipes d and D.
Figure 6:
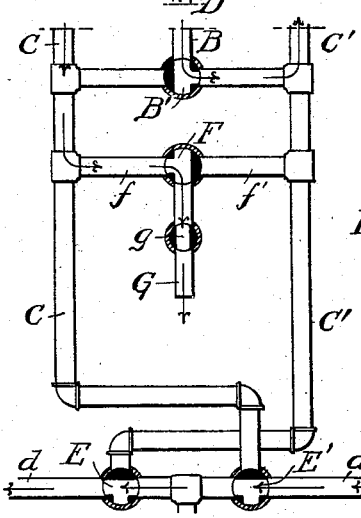
Figure 2:
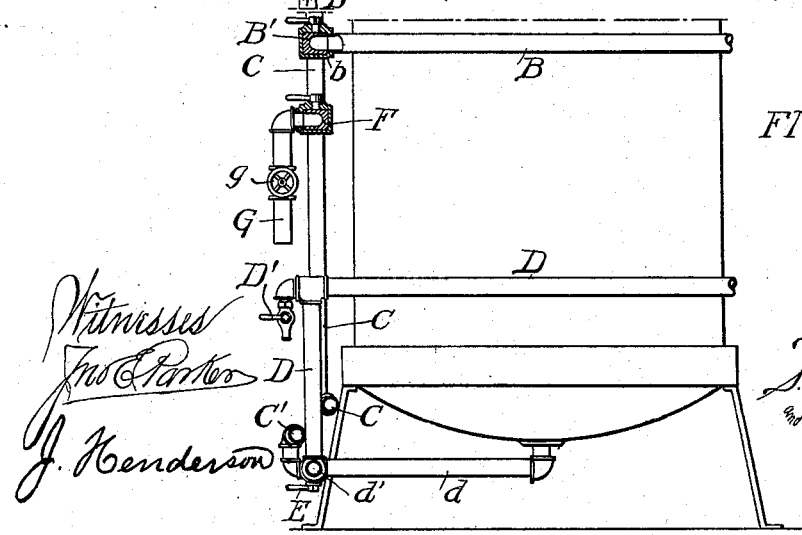

Fig. 6 illustrates the direction of flow and the position of the valves when chamber, A, is to be cleansed with filtered water from chamber, A'. In this arrangement the valve, g, is opened and the fluid after passing through chamber, A', and being discharged into pipe, d', passes directly through the valves, E', and E to pipe, d, and from thence up through the chamber, A, in a direction the reverse of that in which the fluid flows during the filtering process. The scum and deposit in the chamber, A, is forced out through the pipe, C, and down through pipe, f, valve, g, and pipe, G. It is clear that in this operation, although the house supply pipe, D, is still open, the water will flow through the pipe, d and up through the cylinder, A, as described, at the same time allowing a portion of the filtered water from A', to be drawn and used in the house if desired. It is also clear from this construction and arrangement of pipes and three-way valves that the water may be directed through one filtering cylinder, as A', into the house while the other cylinder by an adjustment of the three-way valve, E, is being washed out. To accomplish this, referring to Fig. 6, the valve, E, will be turned to cut off communication between pipes, d', and d and to open the communication between the pipe, C' and d, while the arrangement of the other valves will remain the same as shown in Fig. 6. The flow will be as follows:—A portion of the water from the main, B, passes up through the pipe, C', and into and down through the cylinder, A', the pipe, d', and into the pipe, D, furnishing filtered water to the house by single filtration; at the same time another portion of the water from the main, B, passes down through the pipe, C', into the pipe, d, up through the cylinder, A, out of the top, down through the pipe, C, into the pipe, f, through the cock, g, and out through the waste pipe, G, carrying the refuse material with it. By proper adjustment of the valves it is clear that the water may be filtered through either cylinder while the other is being cleansed in this manner.

The various directions of the flows above described may of course be reversed at will to pass through the chamber to cleanse either chamber, or to filter through one, or other, or both, chambers either singly or successively, and the valves are so arranged as to cut out either cylinder and control the desired flow in case of accidents.

Having thus described our invention, what we claim, and desire to secure by Letters Patent, is—

1. A filtering system, comprising in combination, a plurality of filtering chambers, an inlet pipe for the fluid to be filtered, branch pipes leading therefrom to the inlet ends of the filtering chambers, a three-way controlling valve for directing the fluid from the inlet pipe through one, or other, or both, branch pipes, discharge pipes leading from the filtering chambers, an escape pipe to which each of such discharge pipes is connected, said branch pipes extending to and being connected with the discharge pipes, on opposite sides of the escape pipe, the feeding branch pipe of one chamber being connected to the discharge pipe of the opposite chamber and vice versa, a three-way controlling valve at the junction of each branch pipe with the discharge pipe to which it is connected, substantially as specified.

2. A filtering system, comprising in combination, a plurality of filtering chambers, an inlet pipe for the fluid to be filtered, branch pipes leading therefrom to the inlet ends of the filtering chambers, a three-way controlling valve for directing the fluid through one, or other, or both, branch pipes, discharge pipes leading from the filtering chambers, an escape pipe to which each of such discharge pipes is connected, said branch pipes extending to and being connected with the discharge pipes on opposite sides of the escape pipe, the branch pipe of one chamber being connected to the discharge pipe of the opposite chamber, and vice versa, and three-way controlling valve provided at the junction of each branch pipe with the discharge pipe to which it is connected, as waste pipe, a controlling valve therein, and a pipe extending from said waste pipe to each of the said branch pipes, substantially as specified.

3. A filtering system comprising in combination two filtering chambers, A, A', an inlet pipe, B, for conducting the fluid to be filtered, branch pipes, C, C', leading therefrom to the upper or inlet ends of the filtering chambers, A, A', respectively, a controlling valve, B', for directing the fluid from the pipe B through one, or other, or both, branch pipes, C, C', discharge pipes, d, d', leading from the base of the filtering chambers, A, A', respectively an escape pipe, D, to which each of such discharge pipes, d, d', is connected, said branch pipes, C, C', extending to and being connected to the discharge pipes, $d'$, $d$, respectively on opposite sides of the escape pipe, D, the branch pipe, C, of chamber, A, being connected to the discharge pipe, $d'$, of the opposite chamber, A', and vice versa, controlling valves, E, E', at the junction of the branch pipes, C, C', with the discharge pipes, $d'$, $d$, a waste pipe, G, a controlling valve, $g$, therein, and pipes, $f$, $f'$, extending from said waste pipe, G, to the said branch pipes, C, C', and a three-way valve F at the junction of the pipe $f f'$ and G substantially as specified.

In witness whereof we have hereunto set our hands in the presence of two subscribing witnesses.

SAMUEL B. CUMMINGS.
DAVID W. FIELD.

Witnesses to the signature of Samuel B. Cummings:
H. E. SEIBERT,
CHAS. H. GEILFUSS.

Witnesses to the signature of David W. Field:
ERNEST LOWENGRUND,
JNO. E. PARKER.